(No Model.) 3 Sheets—Sheet 1.
H. BARRY.
ANIMAL TRAP.
No. 380,643. Patented Apr. 3, 1888.
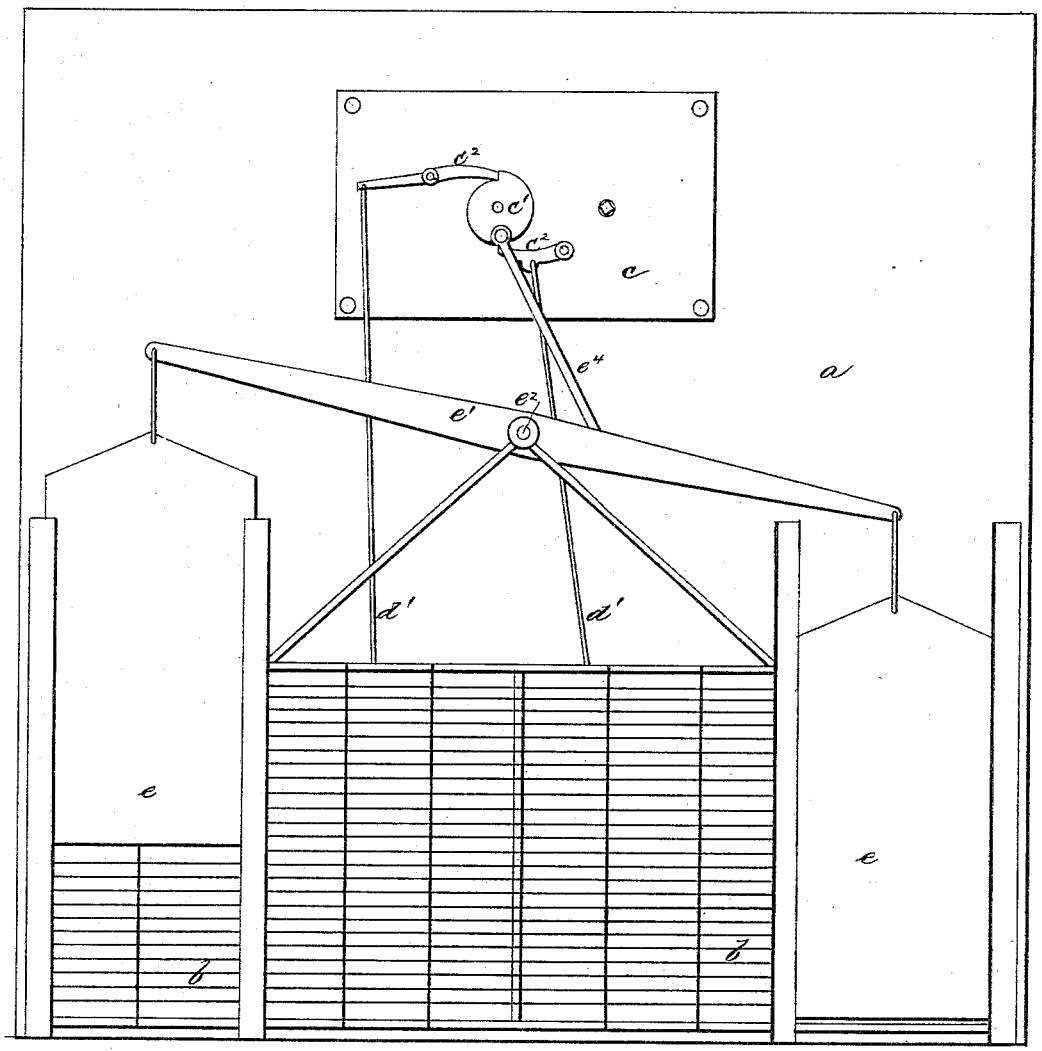
Witnesses:
H. C. McArthur
H. S. McArthur
Inventor
Henry Barry.
per
H. Harrison,
Attorney.
N. PETERS, Photo-Lithographer, Washington, D. C.

(No Model.) 3 Sheets—Sheet 2.
H. BARRY.
ANIMAL TRAP.
No. 380,643. Patented Apr. 3, 1888.
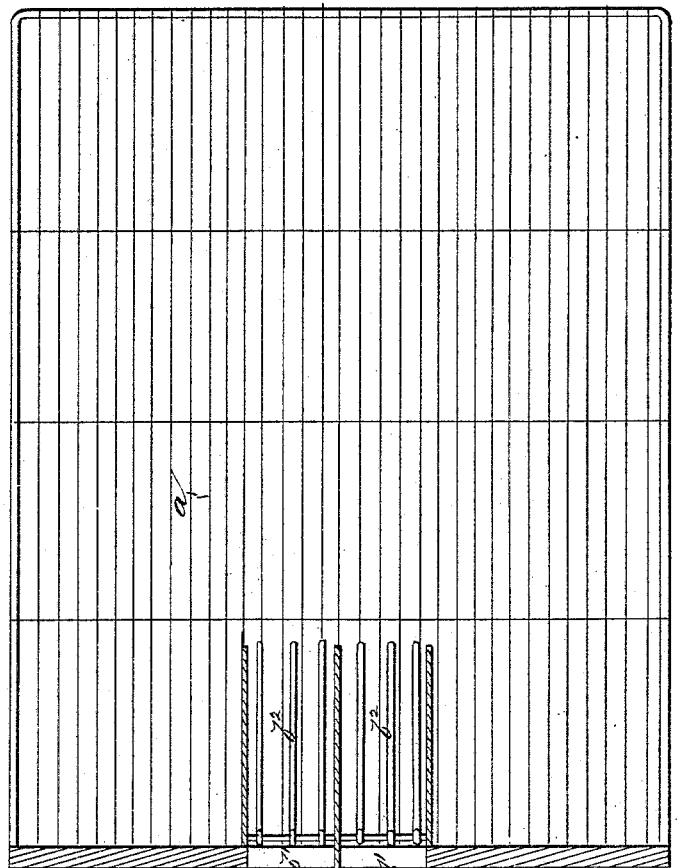
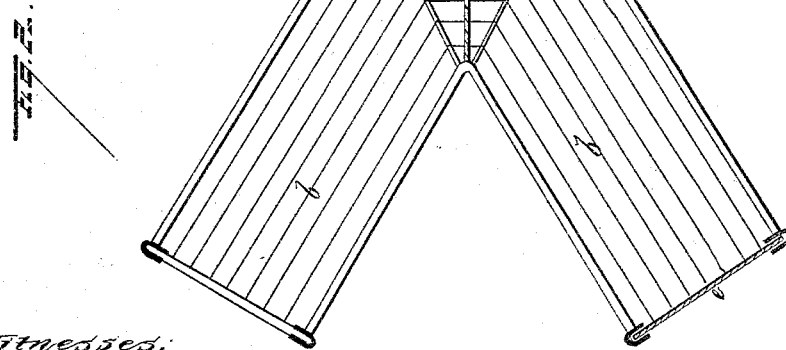

(No Model.) 3 Sheets—Sheet 3.
H. BARRY.
ANIMAL TRAP.
No. 380,643. Patented Apr. 3, 1888.
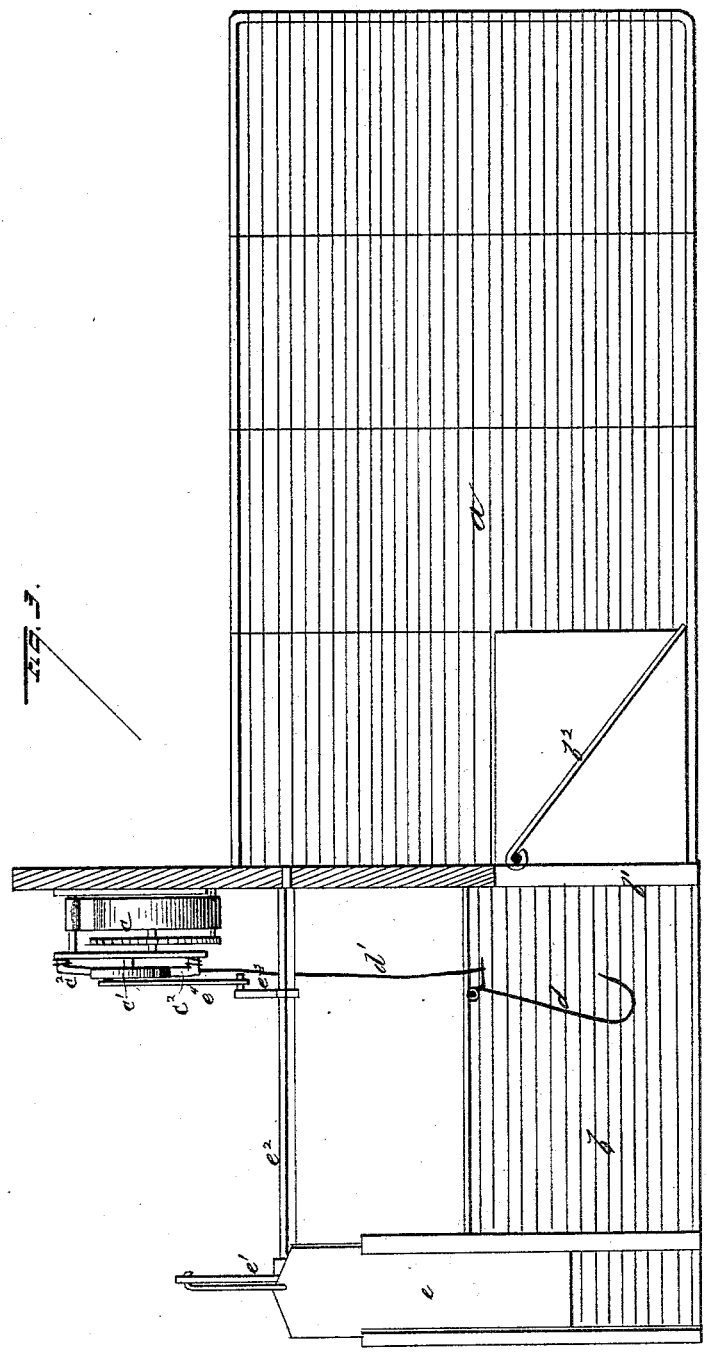
Witnesses:
R. C. McArthur
H. S. McArthur
Inventor:
Henry Barry
per
H. Harrison
Attorney.

UNITED STATES PATENT OFFICE.

HENRY BARRY, OF CHICAGO, ILLINOIS, ASSIGNOR OF ONE-HALF TO DENNIS NORTON, OF SAME PLACE.

ANIMAL-TRAP.

SPECIFICATION forming part of Letters Patent No. 380,643, dated April 3, 1888.

Application filed November 10, 1886. Serial No. 218,457. (No model.)

*To all whom it may concern:*

Be it known that I, HENRY BARRY, a citizen of the United States, residing at Chicago, in the county of Cook and State of Illinois, have invented certain new and useful Improvements in Animal-Traps, of which the following is a specification, to-wit:

This invention relates to an improvement in animal-traps; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 1 is a front elevation of my trap. Fig. 2 is a horizontal section of the same, and Fig. 3 is a longitudinal section of the main receptacle and a side view of the entrance.

$a$ represents a main receptacle which, though made of any material, I prefer to make of wire or similar material, out of which rats and other animals cannot gnaw their way. To the front of this receptacle is secured the entrance, which consists of a pair of separate lanes or passages, $b$, having each its separate entrance $b'$ to the trap closed by a series of hinged wires, $b^2$, which open freely inward, but cannot be opened by the animal from the inside.

Upon the front of the main body of the trap is secured an ordinary clock mechanism, $c$, not necessary to particularly describe, which is upon one of its shafts provided with a notched or shouldered wheel or cam, $c'$, as in Fig. 1, and two pawls, $c^2$, are pivoted near and bear upon the edge of this wheel, as shown.

The bait hooks or triggers $d$ are hung one in each entrance-passage, and connected by wires $d$ with the two pawls, as shown, and when an animal nibbles at the bait the connected pawl releases the stop-cam and allows the clock-work to move till the cam has made a half-revolution and is stopped by the other pawl, as will be evident from the drawings.

The outer end of each passage is provided with upright guides, in which slides a door $e$, and these doors are at their tops connected to the opposite ends of an arm, $e'$, on a rock-shaft, $e^2$, suitably supported. This shaft is provided with a second and shorter arm, $e^3$, connected by a link, $e^4$, with the cam-wheel, as in Figs. 1 and 3.

In use the bait-hooks are baited and the clock mechanism wound up, and the trap is then ready for use. It now stands with one of the sliding doors lifted and the other closed. A rat or other animal entering the open passage nibbles at the bait, thereby drawing back the pawl and releasing the clock-work, which at once turns the cam-disk a half-revolution till it is caught by the other pawl; but this movement also operates the rock-shaft to close the door of the passage in which the animal is and open the other. The animal cannot now escape except by passing through into the main body of the trap, from which he cannot return, and the trap is thus automatically reset, so that other animals may enter, and this automatic action is repeated till the clock mechanism runs down.

It is obvious that, if desired, the stop-pawls may be connected to movable floor-pieces and tripped by the weight of the animal passing over them, instead of the bait-hooks above described.

It will be understood that the pawls are spring-actuated, as shown in Fig. 3, where one of them is seen with a spring coiled about its pivot, and these springs serve to hold the pawls normally against the edge of the cam and thus in proper position to engage the shoulder as it passes around. The nibble of the animal draws back the pawl to release the cam, but the spring at once throws it back to proper place.

Having thus fully described my invention, what I claim as new, and desire to secure by Letters Patent, is—

1. In an animal-trap, the combination, with the main body of the trap provided with two separate entrance lanes or passages, of two vertically-sliding doors placed one in each passage and connected to move together in opposite directions, a clock mechanism connected to these doors to operate them and provided with a pair of stop-pawls, and a pair of bait-hooks in the passages connected to said pawls, substantially as and for the purpose set forth.

2. In an animal-trap, the combination, with the main body of the trap having two separate entrance-passages, each provided at its outer end with a sliding door and at its inner end with a series of hinged wires opening freely into the trap, of a clock mechanism provided with a shouldered cam-disk, a pair of stop-pawls for the same connected to the bait-hooks suspended in the passages, and a rock-shaft connected to the sliding doors and also connected to and operated by the clock mechanism, substantially as and for the purpose set forth.

In testimony whereof I affix my signature in presence of two witnesses.

HENRY BARRY.

Witnesses:
W. C. McARTHUR,
W. S. McARTHUR.